May 10, 1960 J. F. KINKEL 2,936,345

HIGH EFFICIENCY DIRECT CURRENT POWER AMPLIFIER

Filed July 6, 1954 2 Sheets-Sheet 1

INVENTOR.
JOHN F. KINKEL
BY James B. Christie
ATTORNEY

HIGH EFFICIENCY DIRECT CURRENT POWER AMPLIFIER

Filed July 6, 1954 2 Sheets-Sheet 2

INVENTOR.
JOHN F. KINKEL

BY James B. Christie

ATTORNEY

United States Patent Office 2,936,345

Patented May 10, 1960

2,936,345

HIGH EFFICIENCY DIRECT CURRENT POWER AMPLIFIER

John F. Kinkel, Altadena, Calif., assignor, by mesne assignments, to Bell & Howell Company, Chicago, Ill., a corporation of Illinois Application July 6, 1954, Serial No. 441,434

7 Claims. (Cl. 330—74)

This invention relates to direct-coupled (D.C.) amplifiers and more specifically to an improved high-efficiency D.C. power amplifier.

There are many applications in which a D.C. amplifier is required to deliver a considerable amount of power to a load. For example, servomechanisms and controllers often require relatively large amounts of power to drive an electromechanical device.

In many applications high efficiency, i.e., the load utilization of a large fraction of power available from the power supply, is particularly desirable. This results in smaller physical size of the power supply and circuit components, reduced cost, and less power dissipation in the amplifier. In many D.C. amplifiers in which it is desired to pass current through a load in either of two directions, the efficiency, that is, the ratio of load power to supply power, seldom exceeds about 40% and is usually much less in practice.

Recent circuits have been devised in which a somewhat higher percentage of the supply of power is utilized but the efficiency is still lower than is desired for some applications because these circuits are unable to use high efficiency tube types, that is, tubes of relatively low internal impedance. Therefore, a substantial part of the power delivered by the power source is dissipated in the tubes and not utilized by the load. These circuits also suffer the disadvantage that a relatively high signal input voltage is required because of degeneration inherently present in the input stage.

The present invention overcomes these disadvantages by providing a D.C. amplifier in which substantially all of the power delivered by the power supply is utilized in the load and which operates with a relatively low signal input voltage.

Briefly, the invention contemplates a D.C. amplifier circuit for passing an electric current through a load in either of two directions from a source of electrical power. A first current supply control device is connected to the power source and load to control current flow through the load in one direction, and a second current supply control device is connected to the power source and load for controlling current flow through the load in the other direction. A first and second amplifying device, each having an input and an output, have their outputs respectively connected to the first and second supply control devices. Means are provided for applying a signal to the inputs of the amplifying devices so that current is caused to flow through the load in one direction when the signal is of one polarity, and to flow through the load in the other direction when the signal is of opposite polarity.

In a preferred form of the invention the first and second amplifying devices are provided with common degenerative means for obtaining balanced outputs, i.e., equal outputs for equal positive and negative inputs. Preferably, the degenerative means is a cathode resistor common to the cathodes in the amplifying devices. The amplifying device inputs may be used independently for push-pull or differential input, or one input may be biased with respect to the other for single-ended input.

In a form for a push-pull output arrangement the invention comprises a first, second, third and fourth current supply control device. A power source is connected in push-pull arrangement to the first and second current control devices for controlling current through the load in one direction, and to the third and fourth current control devices for controlling current flow through the load in the other direction. The circuit is also provided with a first, second, third and fourth amplifying device, each having an input and an output. The inputs of the first and third amplifying devices are commonly connected, and the inputs of the second and fourth amplifying devices are commonly connected. The outputs of the first, second, third and fourth amplifying devices are operatively connected to the first, fourth, second and third current control devices, respectively. Common degenerative means are provided for the amplifying devices and means are also provided for applying a signal to the amplifying device inputs whereby current is caused to flow through the load in one direction when the signal to the inputs is of one polarity and the flow through the load in the opposite direction when the signal is of opposite polarity. The degenerative means may either be common to all of the amplifying devices, or the first and second amplifying devices may be provided with a first common degenerative means, and the third and fourth amplifying devices may be provided with a second common degenerative means.

These and other aspects of the invention will be more completely understood in the light of the following detailed description taken in conjunction with the accompanying drawings in which.

Figure 1:
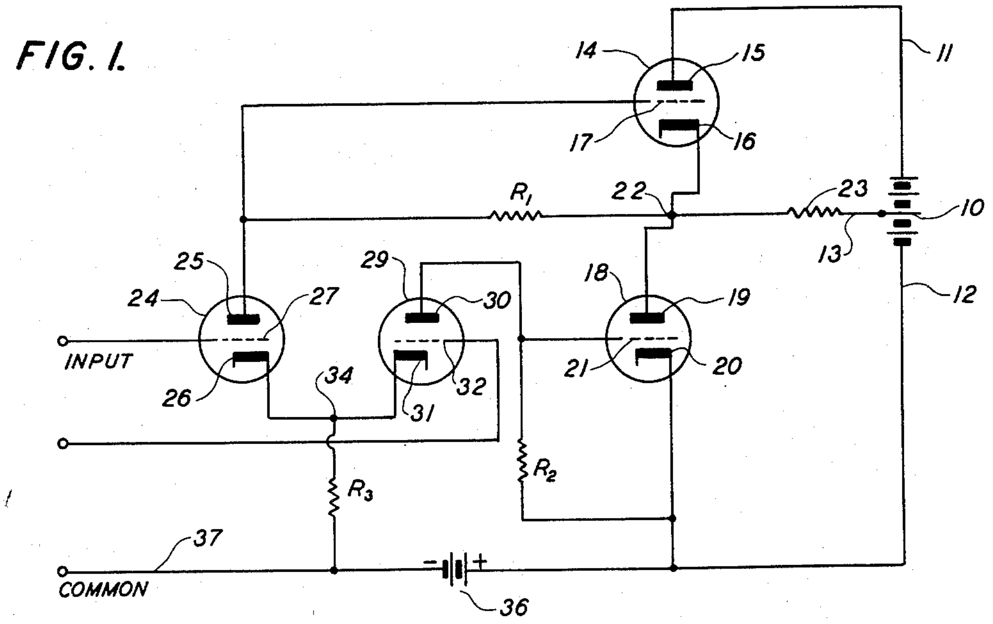
Fig. 1 is a schematic diagram of one form of the invention which is adapted for a push-pull or differential input and a single-ended output.

Referring to Fig. 1, a power source 10 having a positive end terminal 11 and negative end terminal 12 and intermediate terminal 13 is connected serially with a first current supply control device 14 having an anode 15, a cathode 16, and a control electrode 17, and a second current supply control device 18 having an anode 19, a cathode 20 and a control electrode 21. Preferably, the current supply control devices are identical tubes with relatively low internal impedance, e.g., having a plate resistance of the order of 300 ohms. However, tube types of substantially higher plate resistance may also be used and, of course, other types of current control devices such as transistors may be used.

As shown in Fig. 1, there is a first common connection 22 between the cathode of the first current supply control device and the anode of the second current supply control device. A load 23 is connected between the first common connection and the intermediate terminal of the power source.

A first amplifying device 24 having an anode 25, a cathode 26 and a control electrode 27 is arranged with its anode connected directly to the control electrode of the first current control device. The anode 25 is also connected through an anode circuit resistance $R_1$ to the first common connection. A second amplifying device 29 having an anode 30, a cathode 31, and a control electrode 32, is arranged with its anode connected directly to the control electrode of the second current control device. The anode 30 of tube 29 is also connected through a second anode circuit resistance $R_2$ to the cathode of the second current control device. The cathodes of the two amplifying devices are connected to a second common connection 34. As with the current control devices, the amplifying devices may be any suitable type of current control devices. However, tube types having relatively high internal impedances have been found most satisfactory. It is also advantageous to use tube types having a relatively high amplification factor. This permits the utilization of relatively low input signals. For example, tube types having an amplification factor of about 70 and a plate resistance of the order of 45,000 ohms have been found to be satisfactory for use as the amplifying device in this circuit. A common degenerative means in the form of a cathode resistor $R_3$ is serially connected with the second common connection, a source of operating voltage 36 for the amplifying devices, and the cathode of the second current control device. The control electrodes of the two amplifying devices are adapted to receive an input signal, and a lead 37 from the negative end of $R_3$ serves as the common lead for these two control electrodes.

The operation of the circuit is as follows: At the quiescent state, i.e., no signal being applied to the amplifier inputs, the first and second current control devices are each biased near their cutoffs so that only a few milliamps of "idling current" is passing through them from the current source 10. Since the amplifying devices are tube types having high amplification factors and high plate resistances, they draw only a negligible amount of power. Depending on the relative polarity of the signal applied to the amplifier inputs one of the current control devices is made conducting while the other is turned completely off. For example, if a positive signal is applied to the control electrode of the first amplifying device and a negative signal is applied to the control electrode of the second amplifying device, a negative bias is applied to the control electrode of the first current control device and a positive bias is applied to the current control electrode of the second current control device. This causes the first current control devices to be cut off and the second current control device to conduct. Thus, current flows through the load in a direction from right to left as viewed in Fig. 1. If a signal of opposite polarity is applied to the control electrodes, current flows through the load in the other direction.

One advantage of this circuit over the prior art circuits is that both of the current control tubes can be driven to full cut-off and full conduction. This permits this operation over the widest possible range and further increases the efficiency of the load utilization of the current from the current source. For example in using only standard components, an efficiency of 75% is readily achieved. Output balance, that is, equal output signals from the amplifying devices for equal positive and negative input signals, is obtained by signal degeneration of any unbalanced output signals in the common cathode resistor $R_3$. However, the common cathode resistor provides degeneration only when the output from the amplifying devices tends to be unbalanced and does not produce a loss of amplifier gain.

Output balance is further enhanced by using high Mu, high plate resistance tube types for the amplifying devices. Further improvement in output balance can be obtained by adjusting the ratio of $R_2$ to $R_1$ so that the value is less than 1, although in practice equal values for $R_1$ and $R_2$ have proved satisfactory.

Figure 2:
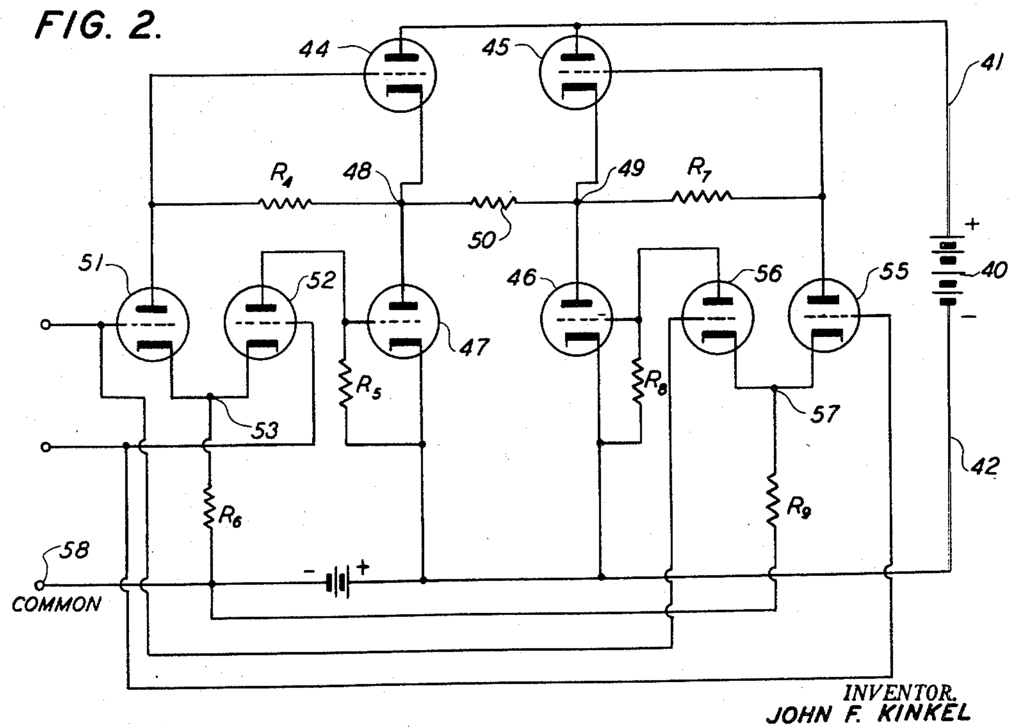
Fig. 2 is a schematic circuit diagram of another form of the invention adapted for a push-pull or differential input and a push-pull output.

While many applications require a single-ended output as shown in Fig. 1, a push-pull output is often desirable. Referring to Fig. 2 which illustrates the invention as adapted for push-pull output and push-pull or differential input, a power source 40 having a positive terminal 41 and a negative terminal 42 is arranged so that its positive terminal is connected to the anodes of a first current control device 44 and a third current control device 45, respectively. The negative terminal of the power source is connected to the cathodes of a second current control device 46 and a fourth current control device 47. There is a first common connection 48 between the cathode and anode of the first and fourth current control devices, respectively. There is a second common connection 49 between the anode and the cathode of the second and third current control devices. A load 50 is connected between the first and second common connections.

The control electrode of the first current control device is connected directly to the anode of a first amplifying tube 51. A first anode circuit resistance $R_4$ is connected serially with the first amplifying tube anode and the first common connection. The control electrode of the fourth current control device is connected directly to the anode of a second amplifying tube 52 and a second anode circuit resistance $R_5$ is connected serially with the anode and the cathode of the fourth current supply control device. The amplifying tube cathodes are connected to a third common connection 53 which in turn is connected through a common degenerative means $R_6$ in the form of a cathode resistor to the negative side of a source of operating voltage 54.

The control electrode of the third current control device is connected directly to the anode of a fourth amplifying tube 55. A third anode circuit resistance $R_7$ is connected serially with the fourth amplifying tube anode and the second common connection 49. The control electrode of the second current control device is connected directly to the anode of a third amplifying tube 56. A fourth anode circuit resistance $R_8$ is connected serially with the cathode of the second current control device and the anode of the third amplifying tube. The cathodes of the third and fourth amplifying tubes are connected to a fourth common connection 57 which in turn is connected through a common degenerative means $R_9$ in the form of a cathode resistor to the negative side of the source of operating voltage.

The positive side of the source of operating voltage is connected to the cathodes of the second and fourth current control devices, and to the negative terminal of the power source. The control electrodes of the first and third amplifying tubes are commonly connected and the control electrodes of the second and fourth amplifying tubes are commonly connected. A lead 58, connected to the negative ends of the cathode resistor $R_6$ and $R_9$, serves as a common lead for the control electrodes of the amplifying tubes. Thus the circuit is arranged for push-pull or differential input and push-pull output.

The operation of the circuit of Fig. 2 is quite similar to the operation of the circuit of Fig. 1. At the quiescent state all of the current control devices are biased so that a negligible amount of idling current is passing through each of them. When a positive signal is applied to the first and third amplifying tubes the first and second current control devices are respectively cut off. If at the same time a negative signal is applied to the second and fourth amplifying tubes, the third and fourth current control devices are made more conducting. This causes current to flow through the load in a direction from right to left as viewed in Fig. 2. Furthermore, the voltage applied across the load is the entire voltage of the current supply rather than some portion thereof, as in the case with Fig. 1. If a signal of opposite polarity is applied to the amplifying tube, current is caused to flow through the load in the other direction.

Figure 3:
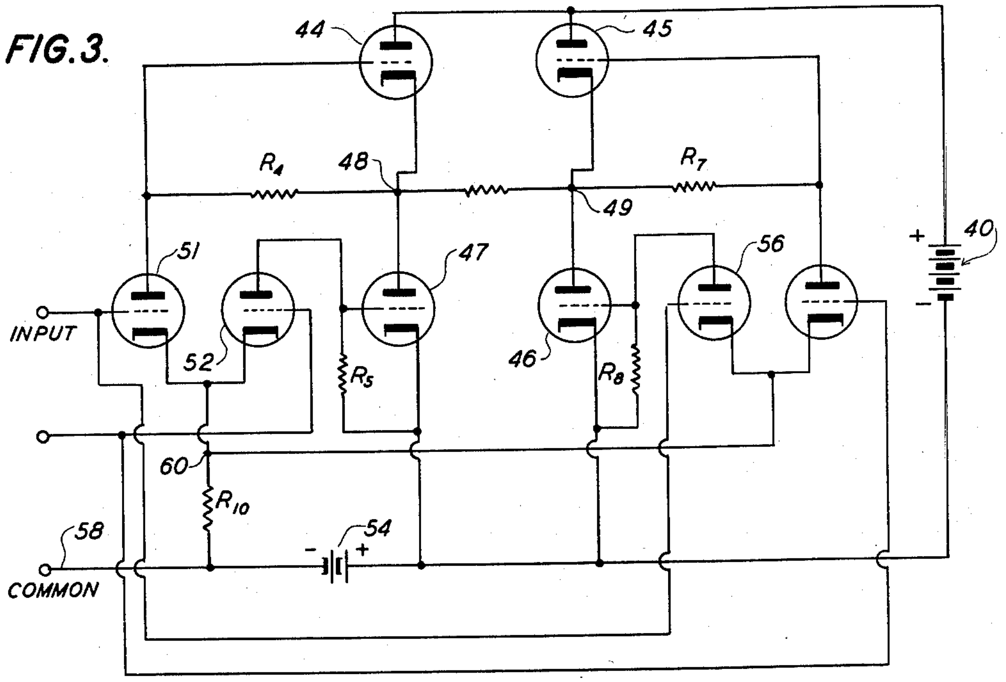
Fig. 3 is a schematic circuit diagram showing an embodiment of the invention adapted for a push-pull or differential input, a push-pull output, and a degenerative means common to all of the amplifying devices.

In the push-pull arrangement just described for Fig. 2, each pair of amplifying tubes is illustrated as having a common degenerative means. However, a single common degenerative means may be provided for all the amplifying tubes and such an arrangement is illustrated in Fig. 3. The circuit of Fig. 3 and its operation is identical to the circuit illustrated in Fig. 2, except that the two cathode resistors $R_6$ and $R_9$ are replaced by a single cathode resistor $R_{10}$ which is connected serially with a common connection 60, to which all of the cathodes of the amplifiers are connected, and with the negative side of the supply of operating voltage.

Figure 4:
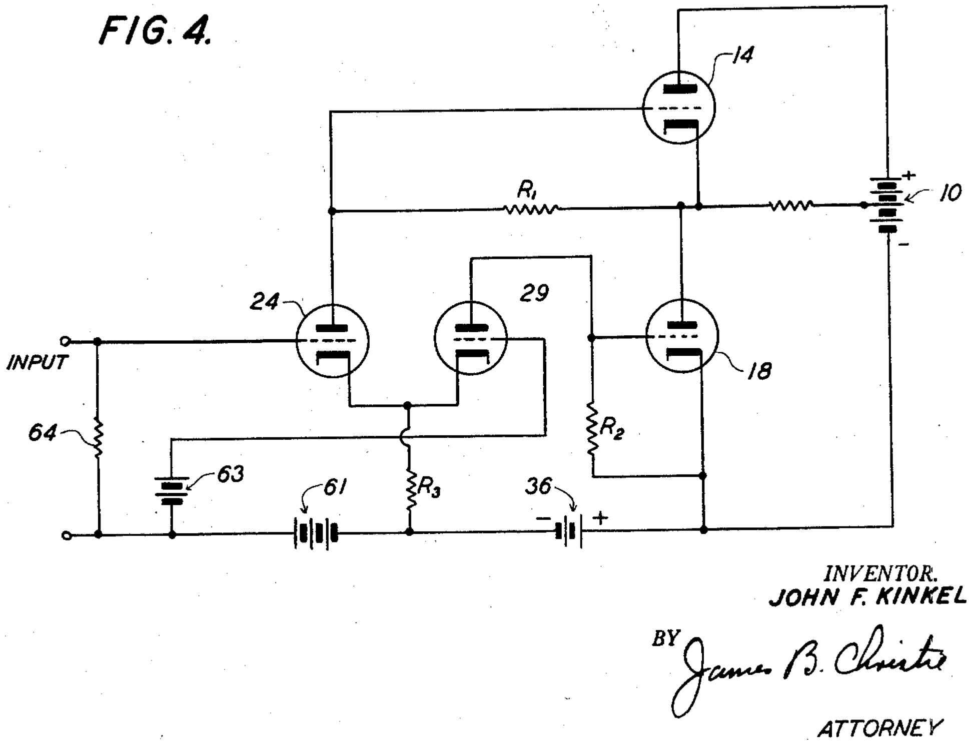
Fig. 4 is a schematic circuit diagram of another form of the invention adapted for a single-ended input and a single-ended output.

Fig. 4 illustrates schematically how the circuit of Fig. 1 may be modified to provide a single-ended input and output. The circuits of Figs. 2 and 3 may also be similarly modified if a single-ended input and push-pull output are desired. In Fig. 4, which is quite similar to Fig. 1, like reference characters are used to designate like components. The principal difference between the circuits of Figs. 1 and 4 is that in Fig. 4 a source of bucking voltage 61 has its negative terminal connected to the negative end of cathode resistor $R_3$ and its positive end is to an input terminal 62. The size of the bucking voltage source is sufficient to cancel the voltage drop in the cathode resistor. For clarity of illustration, a separate biasing voltage 63 is shown connected between the common lead 37 and the control electrode of the second amplifier 29. An input resistance 64 is connected across the common lead and the control electrode of the first amplifier 24. Thus the bias on the control electrode of the second amplifier is slightly more positive than the bias on the control electrode of the first amplifier. This compensates for the difference in operating voltages applied across the two amplifiers and allows the current being conducted through the amplifiers under quiescent conditions to be substantially equal.

The operation of the circuit of Fig. 4 is similar in principle to that described for the circuits of Figs. 1 and 2.

The D.C. amplifier of this invention provides the following advantages:

(1) It permits the use of tubes of low internal impedance.

(2) It permits the tubes to be operated with a low idling power.

(3) Low signal inputs may be used since positive amplification is provided in the input stage of the amplifier.

(4) Substantially all of the current delivered by the power supply is utilized in the load.

(5) It permits the use of single-ended, push-pull, or differential input.

(6) It provides for either single-ended or push-pull output.

I claim:

1. In a circuit for passing an electric current through a load in either of two directions in response to input signals including low amplitude direct current input signals, the combination comprising a current source having two end terminals and an intermediate terminal, a first current supply control device having an anode, cathode, and control electrode, a second current supply control device having an anode, cathode, and control electrode, a first common connection between the cathode of the first current control device and the anode of the second current control device, the load being connected between the intermediate terminal of the current source and the first common connection, the anode of the first current control device being connected to one end terminal of the current source, the cathode of the second current control device being connected to the other end terminal of the current source, first and second high gain amplifying devices connected to alternately control the conduction and non-conduction of said first and second current control devices, said first amplifying device having an anode, cathode, and a control electrode, the anode of the first amplifying device being directly connected to the first current control device control electrode, a first anode circuit resistance connected between the first amplifying device anode and the first common connection, said second amplifying device having an anode, cathode and a control electrode, the anode of the second amplifying device being directly connected to the second current control device control electrode, a second anode circuit resistance connected between the second amplifying device anode and the second current control device cathode, means connecting the cathode of the first amplifying device to the cathode of the second amplifying device, means including a source of potential connecting the cathodes of the first and second amplifying devices to the cathode of the second current control device for maintaining balanced outputs, and means for applying the input signals across the control electrodes and respective cathodes of the two amplifying devices, whereby the first and second amplifying devices change their conductive conditions in opposite directions in response to the input signals.

2. In a circuit for passing an electric current through a load in either of two directions in response to input signals including low amplitude direct current input signals, the combination comprising a current source having two end terminals and an intermediate terminal, a first current supply control device having an anode, cathode, and control electrode, a second current supply control device having an anode, cathode, and control electrode, a first common connection between the cathode of the first current control device and the anode of the second current control device, the load being connected between the intermediate terminal of the current source and the first common connection, the anode of the first current control device being connected to one end terminal of the current source, the cathode of the second current control device being connected to the other end terminal of the current source, first and second high gain amplifying devices connected to alternately control the conduction and non-conductions of said first and second current control devices, said first amplifying device having an anode, cathode, and a control electrode, the anode of the first amplifying device being directly connected to the first current control device control electrode, a first anode circuit resistance connected between the first amplifying device anode and the first common connection, said second amplifying device having an anode, cathode and a control electrode, the anode of the second amplifying device being directly connected to the second current control device control electrode, a second anode circuit resistance connected between the second amplifying device anode and the second current control device cathode, a common cathode impedance connected at one end to the cathodes of the first and second amplifying devices for maintaining balanced output currents, means including a source of potential coupled between the other end of the common cathode impedance and the cathode of the second current control device, and means for applying input signals across the control electrodes and respective cathodes of the two amplifying devices whereby the first and second amplifying devices change their conductive conditions in opposite directions in response to the input signals and may be alternately placed in a conductive and non-conductive condition.

3. In a circuit for passing current through a load in either of two directions in response to input signals including low amplitude direct current input signals, the combination comprising an electrical current source having two end terminals and an intermediate terminal, a first current supply control device having an anode, cathode, and control electrode, a second current supply control device having an anode, cathode, and control electrode, a first common connection between the cathode of the first current control device and the anode of the second current control device, the load being connected between the intermediate terminal of the current source and the first common connection, the anode of the first current control device being connected to one end terminal of the current source, the cathode of the second current control device being connected to the other end terminal of the current source, first and second high gain amplifying devices connected to alternately control the conduction and non-conduction of said first and second current control devices, said first amplifying device having an anode, cathode, and a control electrode, the anode of the first amplifying device being directly connected to the first current control device control electrode, a first anode circuit resistance connected between the first amplifying device anode and the first common connection, a second amplifying device having an anode, cathode, and a control electrode, the anode of the second amplifying device being directly connected to the second current control device control electrode, a second anode circuit resistance connected between the second amplifying device anode and the second current control device cathode, a common cathode impedance connected at one end to the cathodes of first and second amplifying devices, means including a source of potential coupled between the other end of the common cathode impedance and the cathode of the second current control device, means for biasing one amplifying device control electrode with respect to its cathode, and means for applying the signals which control the passage of current through the load between the control electrode and cathode of the other amplifying device.

4. In a signal-responsive circuit for passing an electric current through a load in either of two directions, the combination comprising first, second, third, and fourth current supply control devices, each of the current control devices having an anode, a cathode, and a control electrode, a current source having one terminal connected to the anodes of the first and third current supply control devices, and having its opposite terminal connected to the cathodes of the second and fourth current control devices, a first common connection between the cathode of the first current control device and the anode of the fourth current control device, a second common connection between the cathode of the third current control device and the anode of the second current control device, the load being connected serially with the first and second common connections, first, second, third and fourth amplifying devices, each having an anode, a cathode, and a control electrode, the control electrodes of the first and third amplifying devices being commonly connected and the control electrodes of the second and fourth amplifying devices being commonly connected, the anodes of the first, second, third and fourth amplifying devices being respectively connected to the control electrodes of the first, fourth, second and third current control devices, a first anode circuit resistance serially connected with the first amplifying device anode and the first common connection, a second anode circuit resistance serially connected with the second amplifying device anode and the fourth current control device cathode, a third anode circuit resistance serially connected with the third amplifying device anode and the second current control device cathode, a fourth anode circuit resistance serially connected with the anode of the fourth amplifying device anode and the second common connection, means coupling the cathodes of the first and fourth amplifying devices to the cathodes of the second and fourth current control device, means including a source of potential coupled between the cathodes of the second and third amplifying devices and the cathodes of the second and fourth current control devices, and means for applying the signals across the control electrodes and respective cathodes of the amplifying devices.

5. A circuit according to claim 4 in which the current supply control devices are of a predetermined internal impedance, and the amplifying devices are of a substantially higher internal impedance.

6. A circuit according to claim 4 which includes a common cathode impedance for the amplifying devices.

7. A circuit according to claim 4 which includes a first common cathode impedance for the first and second amplifying devices, and a second common cathode impedance for the third and fourth amplifying devices.

References Cited in the file of this patent

UNITED STATES PATENTS

| | | |
|---|---|---|
| 1,985,923 | Gutmann | Jan. 1, 1935 |
| 2,329,073 | Mitchell et al. | Sept. 7, 1943 |
| 2,431,973 | White | Dec. 2, 1947 |
| 2,670,410 | Williams | Feb. 23, 1954 |
| 2,677,729 | Mayne | May 4, 1954 |
| 2,761,019 | Hall | Aug. 28, 1956 |
| 2,783,314 | Reaves | Feb. 26, 1957 |

OTHER REFERENCES

Publication: Audio Eng., vol. 35, Issue 5, published May 1951, pages 15, 46, 47, 48, titled "A Survey of Audio-Frequency Power-Amplifier Circuits," by Sulzer.